(12) United States Patent
Liu et al.

(10) Patent No.: US 7,093,060 B2
(45) Date of Patent: Aug. 15, 2006

(54) ACCESS METHOD AND ARCHITECTURE OF NON-VOLATILE RANDOM ACCESS MEMORY

(75) Inventors: Chien-Hsing Liu, Taipei (TW); Xin-Cheng Shen, Taipei (TW); Zheng-Zian Li, Taipei (TW)

(73) Assignee: ICP Electronics Inc., Taipei (TW)

( * ) Notice: Subject to any disclaimer, the term of this patent is extended or adjusted under 35 U.S.C. 154(b) by 469 days.

(21) Appl. No.: 10/605,161

(22) Filed: Sep. 12, 2003

(65) Prior Publication Data
US 2004/0128431 A1 Jul. 1, 2004

(30) Foreign Application Priority Data
Dec. 30, 2002 (TW) .............................. 91137817 A

(51) Int. Cl.
*G06F 12/00* (2006.01)
(52) U.S. Cl. ................... 711/100; 711/154; 711/103
(58) Field of Classification Search ............... 711/100, 711/103, 154; 365/191
See application file for complete search history.

(56) References Cited

U.S. PATENT DOCUMENTS 6,851,025 B1 * 2/2005 Park ........................... 711/137
2003/0174547 A1 * 9/2003 Nakata et al. ............... 365/191

\* cited by examiner

*Primary Examiner*—Kimberly N. McLean-Mayo
(74) *Attorney, Agent, or Firm*—Jianq Chyun IP Office

(57) ABSTRACT

The present invention provides a method as well as an architecture for a host equipped with a CPU-level processing capability to access a Non-Volatile Random Access Memory (NVRAM) and at least a controller via a simple 3-wire/4-wire mechanism. The data stored in the NVRAM are shared with the controller and the host. More importantly, a multi-access mechanism further having a pragmatic bit determines the pragmatic bit for either the controller or the NVRAM. With the method of the present invention, computer system resources can be fully utilized, and thereby, peripheral devices can be easily added to the system in an inexpensive and highly efficient way.

19 Claims, 14 Drawing Sheets

ACCESS METHOD AND ARCHITECTURE OF NON-VOLATILE RANDOM ACCESS MEMORY

CROSS REFERENCE TO RELATED APPLICATIONS

This application claims the priority benefit of Taiwan application serial no. 91137817, filed on Dec. 30, 2002.

BACKGROUND OF INVENTION

1. Field of the Invention

The present invention relates to an access method and architecture of a computer memory, and more particularly to a multi-access mechanism having a pragmatic bit to determine either a non-volatile random access memory (NVRAM) or a computer peripheral controller device is the controlled device.

2. Description of the Related Art

In a use of a Non-Volatile Random Access Memory (NVRAM), the NVRAM can be directly coupled to a host via a 3-wire or a 4-wire mechanism. The host is a device equipped with a central processing unit (CPU) level of processing unit. It has the ability of independently executing an application program. As shown in FIG. 1A, a NVRAM is coupled to the host via a 3-wire mechanism, wherein CS is a chip-select line, SK is a system-clock line, and DI/DO is a data-input/data-output line. As shown in FIG. 1B, a 4-wire mechanism is employed to connect the host and a NVRAM, wherein CS is a ship-select line, SK is a system-clock line, DI is a data-input line, and DO is a data-output line. Apparently, the major difference between the 3-wire and the 4-wire mechanisms is that the data-input and data-output lines are integrated in a single line in the 3-wire mechanism. Signals transmitted between the host and a NVRAM are depicted in FIG. 2. As shown in FIG. 2, data stored in the NVRAM are read to the host. During a period when CS is at a high potential level or logic 1 state, the NVRAM is selected and is enabled to respond to an instruction issued by the host. The system clock synchronizes the instruction and data transmission. In FIG. 2, a "READ" command comprising Ai to A0 is transmitted to the NVRAM at the third clock pulse via the data-input line. During the command transmission, the data-output line is in high-impedance mode (Hi-Z). After receiving the command from the host, the NVRAM responds by sending a sequence of data (Dj~D0) via the data-output line. The NVRAM with the 3-wire or 4-wire mechanism has been widely used for years in the computer industry for its simple instructions and easy implementation of hardware interface.

Accordingly, in a NVRAM with a 3-wire or 4-wire mechanism, a host to a NVRAM is conventionally a one-to-one architecture such that the host can only select or enable one device, i.e., the NVARM. As the use of computers expands, computers are built in more functions and higher capacities. The conventional one-to-one architecture is considered inefficient and wasteful in system resources of the computers.

Therefore, there is a need to use a host to control not only a NVRAM but also some other peripheral devices, such as a RS-232 I/O controller or a micro-controller, so as to enhance the processing capacity and the performance of the system.

SUMMARY OF INVENTION

The present invention is directed to an access method and architecture of a NVRAM and a plurality of controllers to allow the host to access a plurality of peripherals via a 3-wire or 4-wire mechanism.

The method comprises steps of first coupling a host with a NVRAM and at least one controller via a chip-select line, a system-clock line and a data transmission wiring. The access method includes steps of issuing instructions from the host to the NVRAM or the controller, which allows the host to access multiple peripherals without additional hardware resources. Moreover, the host and the peripherals can simultaneously share the contents of the NVRAM according to the instructions issued by the host.

To achieve the aforementioned objects and other objects, the present invention provides an access method and architecture to couple the host, the NVRAM, and the controller via a 3-wire or 4-wire mechanism. To allow the host to access the NVRAM and the controller via a shared link, a pragmatic bit with setup information is introduced to be appended to the end of the instruction that is issued by the host to the NVRAM and the controller. Accordingly, the instruction is executed at the NVRAM or at the controller according to the pragmatic bit.

In a preferred embodiment of the present invention, the signal transmission of the NVRAM responsive to the data transmission wiring and the system-clock line is disabled when the pragmatic bit indicates that the instruction is for the controller.

In another preferred embodiment of the present invention, when the pragmatic bit indicates that the instruction is for the NVRAM, the signal transmission of the NVRAM responsive to the data transmission wiring and the system-clock line is enabled, and is subsequently disabled at the end of the data transmission.

To sum up, the present invention provides an access method and architecture of a NVRAM via a 3-wire or 4-wire mechanism. The method uses a pragmatic bit accompanied with the instruction to indicate the target of the instruction. The present invention allows the host to communicate with not only the NVRAM but also at least one controller without additional hardware. Therefore, the access method of the invention allows the host and the peripherals to share the contents of the NVRAM according to the pragmatic bit, and further, the method is compatible with the conventional access methods.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the embodiments of the invention, and are incorporated in and constitute a part of this specification. The drawings illustrate embodiments of the invention and, together with the description, serve to explain the principles of the invention.

DETAILED DESCRIPTION

Figure 1A:
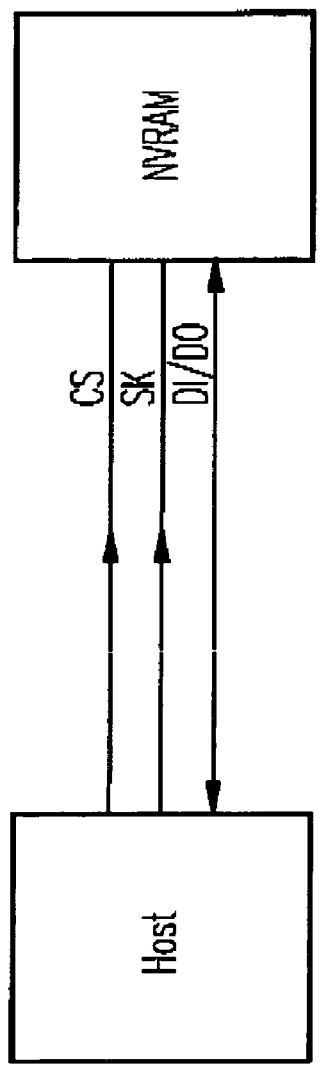
FIG. 1A is a block diagram showing a conventional 3-wire mechanism for coupling a host and a NVRAM.
Figure 1B:
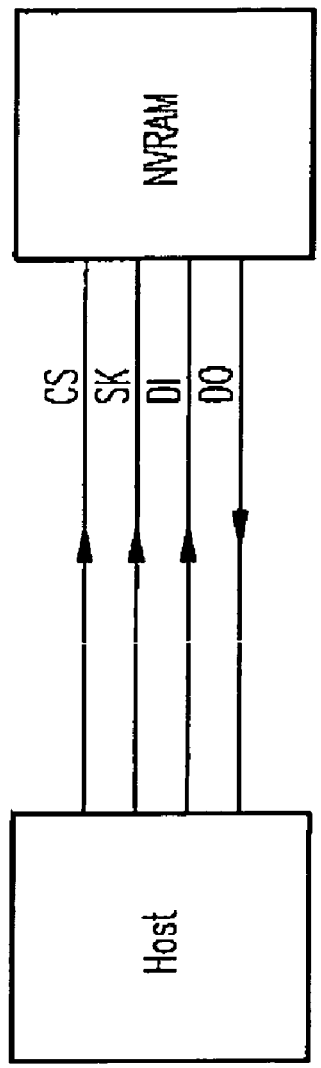
FIG. 1B is a block diagram showing a conventional 4-wire mechanism for coupling a host and a NVRAM.
Figure 2:
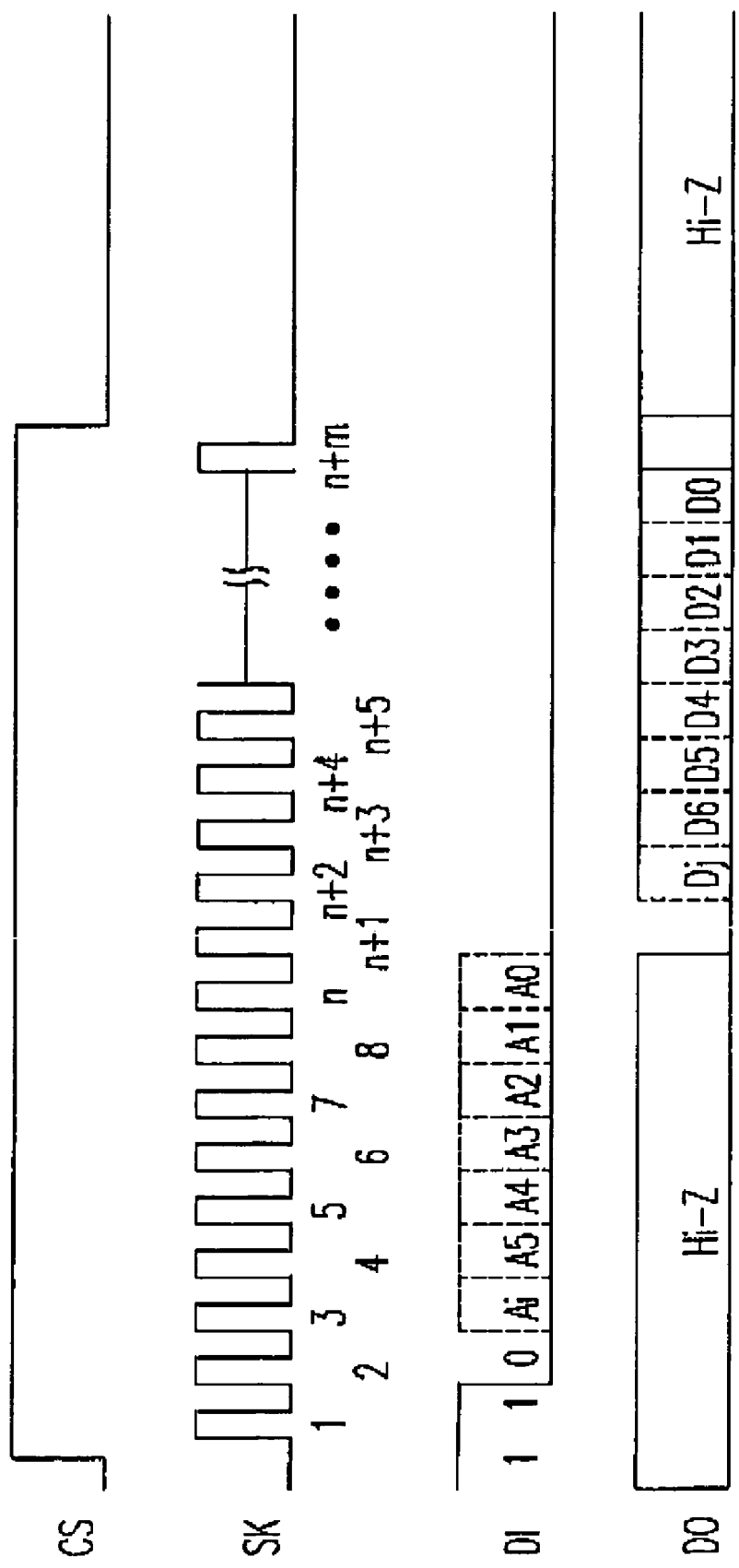
FIG. 2 is a timing chart for signal transmitting between a host and a NVRAM.
Figure 3:
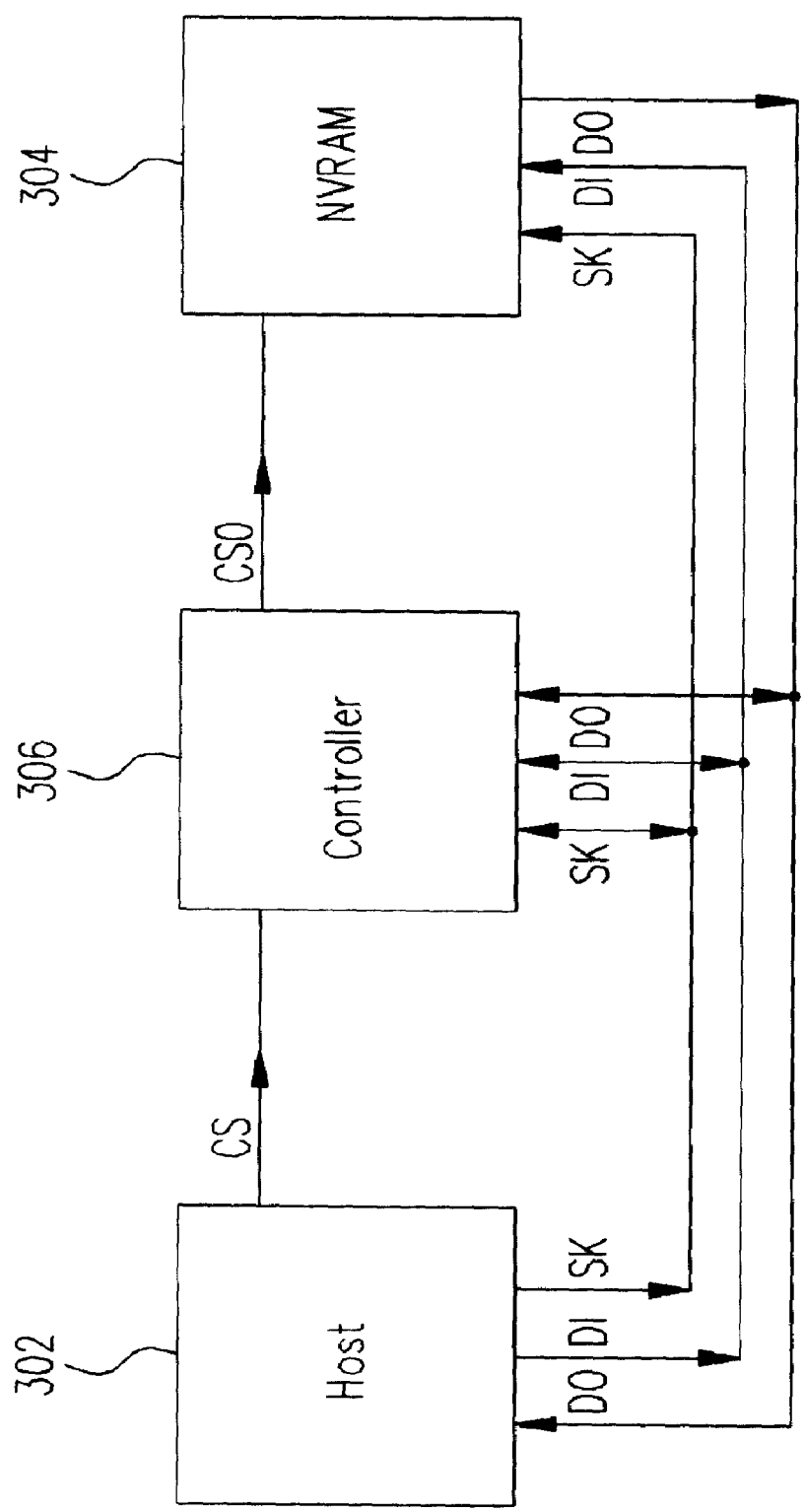
FIG. 3 is a block diagram showing a 4-wire mechanism with a single controller in accordance with one preferred embodiment of the present invention.

FIG. 3 depicts a preferred embodiment of an access method of a NVRAM with a 4-wire mechanism in accordance with the present invention. The architecture 300 of the NVRAM with 4-wire mechanism includes the host 302, the controller 306, and the NVRAM 304. The host 302 is coupled with the controller 306, and the controller 306 is in turn coupled with the NVRAM 304 via chip-select lines (CS and CS0), system-clock lines (SK), data-input lines (DI), and data-output lines (DO).

Figure 4:
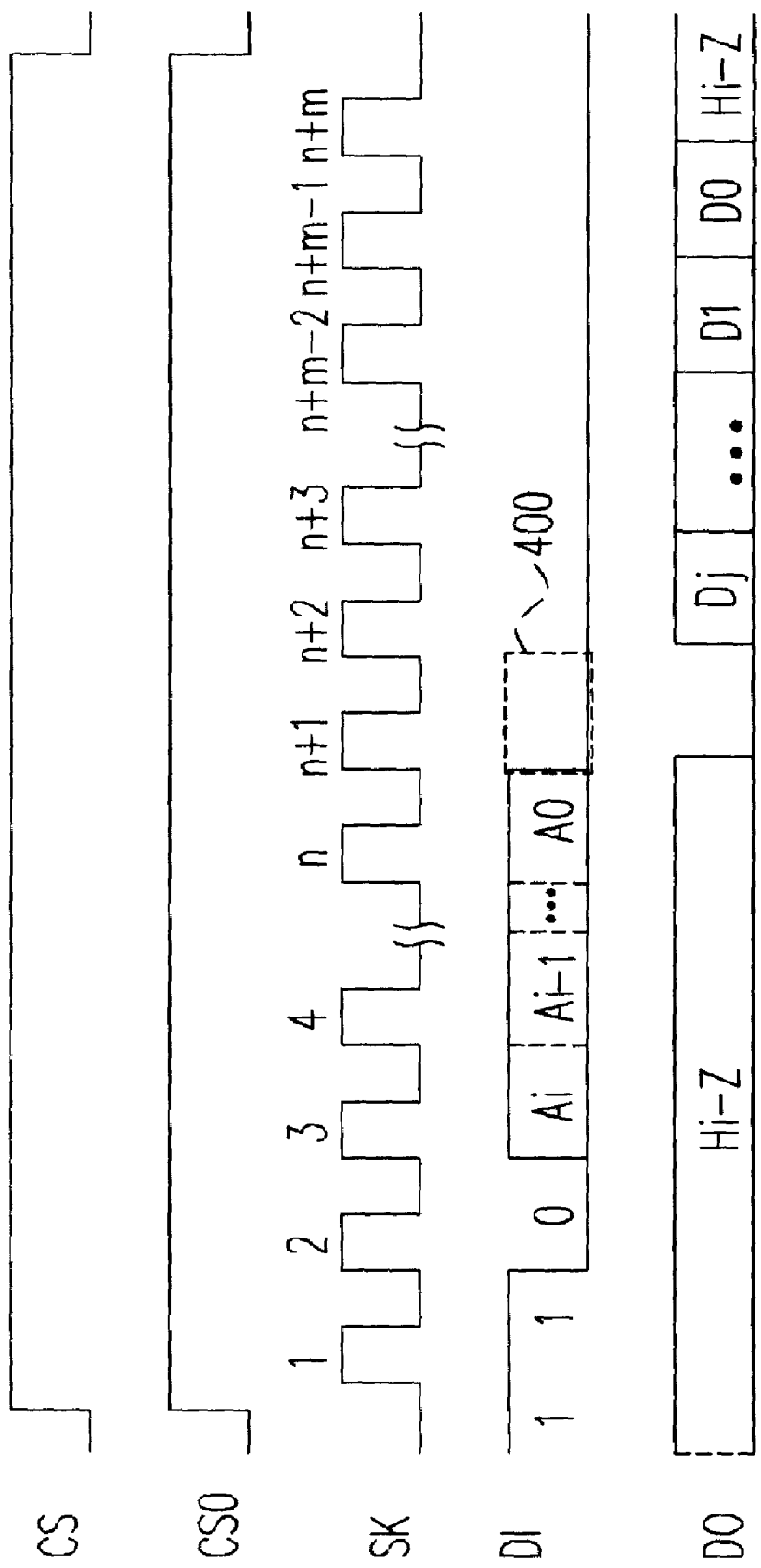
FIG. 4 is a timing chart for signal in accordance with the preferred embodiment shown in FIG. 3.

The method of controlling the NVRAM is described in accordance with preferred embodiments of the invention. FIG. 4 is a timing chart depicting the host 302 which accesses the NVRAM 304 as shown in FIG. 3. The host 302 enables the controller 306 via a first chip-select line (CS), and the controller 306 enables the NVRAM 304 via a second chip-select line (CS0). The host 302 issues a series of instructions (Ai~A0) starting from the third clock cycle on the system-clock line (SK). A pragmatic bit, such as a binary bit, is preferably appended to the end of the instruction issued by the host. When the pragmatic bit 400 that is appended to the last bit A0 of the instruction is of low potential level, the controller 306 will ignore the instruction, maintain a signal of a high potential level via the chip-select line CS0, and thus continue to enable the NVRAM 304. Then, the NVRAM 304 receives the instruction and sends data according to the instruction via a data-output line (DO). In other words, when the pragmatic bit 400 indicates that the instruction is for the NVRAM 304, the controller 306 will enable the NVRAMs (304s) response to signals transmitted through the data transmission wiring (DI/DO) and the system-clock line (SK), and, upon the end of the data transmission, the controller 306 will be turned off the response to the signals transmitted through the data transmission wiring (DI/DO) and the system-clock line (SK).

Figure 5A:
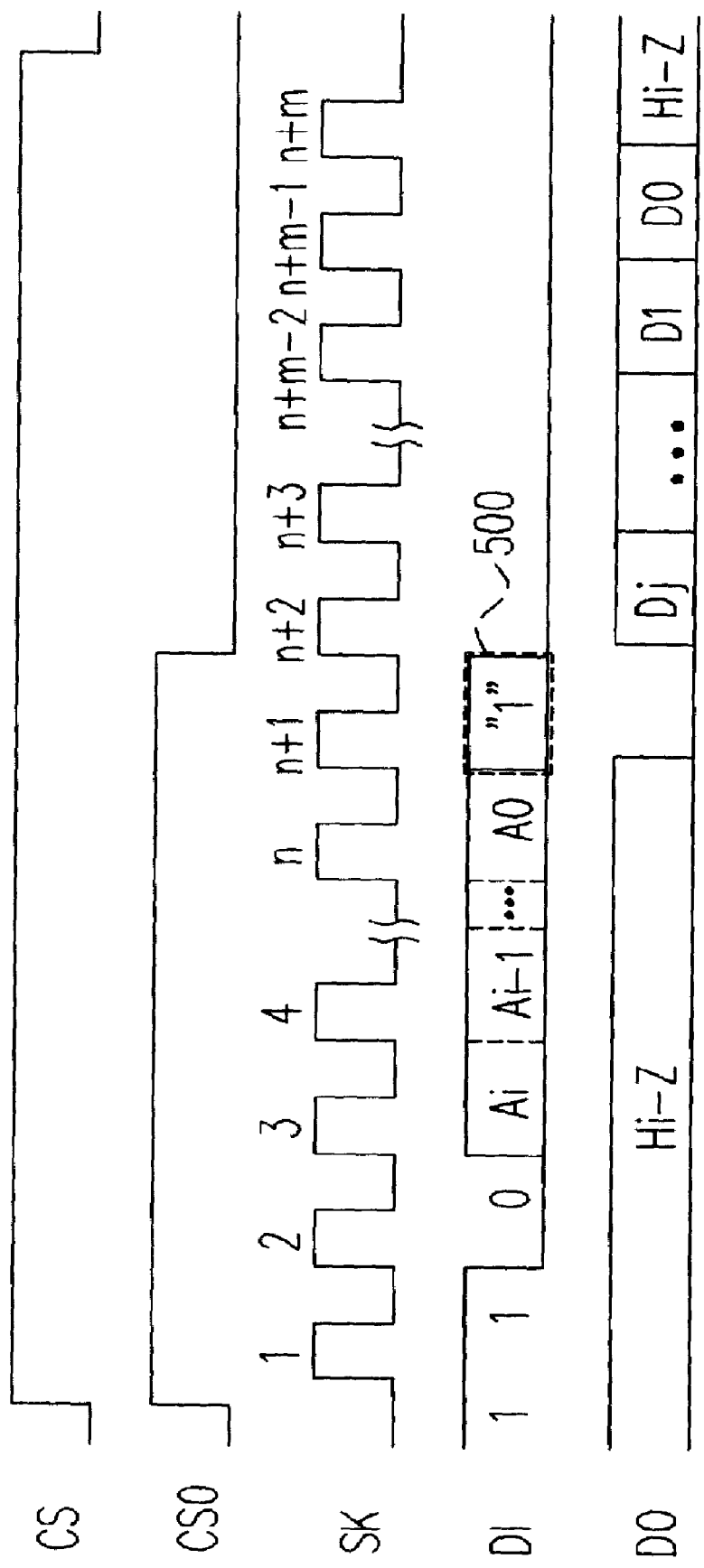
FIG. 5A is a timing chart for signal in accordance with one preferred embodiment with a pragmatic bit set to enable a controller.

FIG. 5A is a signal timing chart showing the transmission of data from the controller 306 to the host 302. Referring to FIG. 3 and FIG. 5A, when a pragmatic bit 500 is of a high potential level of logic "1" and the received instruction is for the controller 306 to transmit data, the controller 306 sends out the data via the data-output line (DO). Meanwhile, the controller 306 sets a low potential level on the chip-select line (CS0), thereby causing the NVRAM 304 to be disabled and fail to receive the instruction. In other words, the controller 306 turns off the NVRAMs (304"s) response to the signals on the data transmission wiring (DI/DO) and the system-clock line (SK) when the pragmatic bit 500 indicates that the instruction is for the controller 306.

Figure 5B:
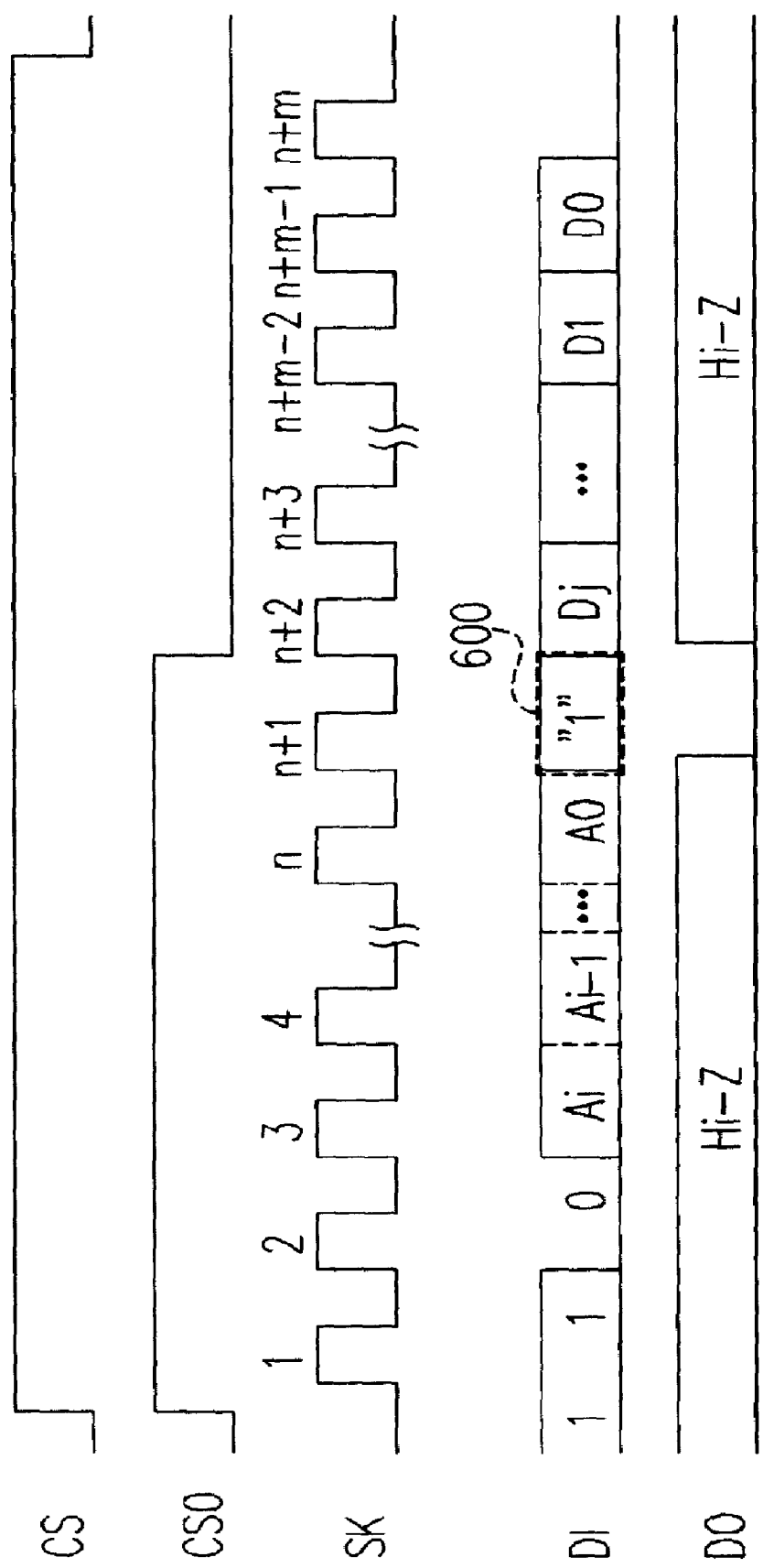
FIG. 5B is a timing chart for signal in accordance with one preferred embodiment with a pragmatic bit set to enable a controller and a series of data following the pragmatic bit to setup the controller.

Please refer to FIG. 5B in combination with FIG. 3. FIG. 5B is a signal timing chart showing signals when the host 302 sets up the controller 306. The circuit layout is similar to that shown in FIG. 5A. Nevertheless, as shown in FIG. 5B, when a pragmatic bit 600 is of high potential level and the instruction received demands the controller 306 to input data, the controller 306 sends defined data (Dj~D0) via the data-input line (DI) so that the controller 306 is able to perform according to the instruction.

Figure 6:
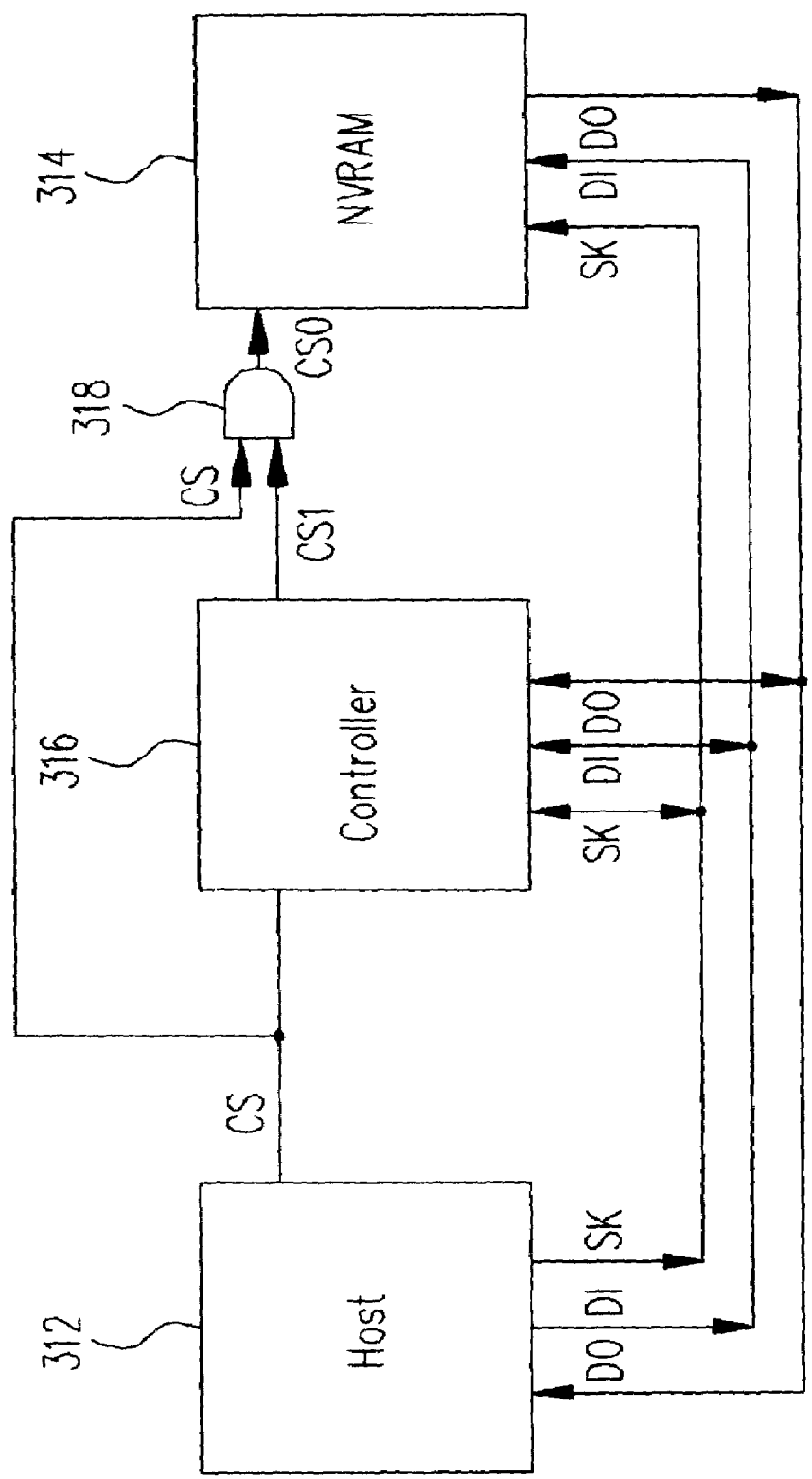
FIG. 6 is a block diagram showing a 4-wire mechanism for coupling the host, the controller, and the NVRAM in accordance with one preferred embodiment of the invention.

FIG. 6 is a block diagram showing one preferred embodiment of the present invention. The 4-wire architecture 310 is similar to that in FIG. 3. Nevertheless, in FIG. 6, an AND gate 318 is used to connect chip-select lines CS and CS1 to enable a NVRAM 314.

Figure 7A:
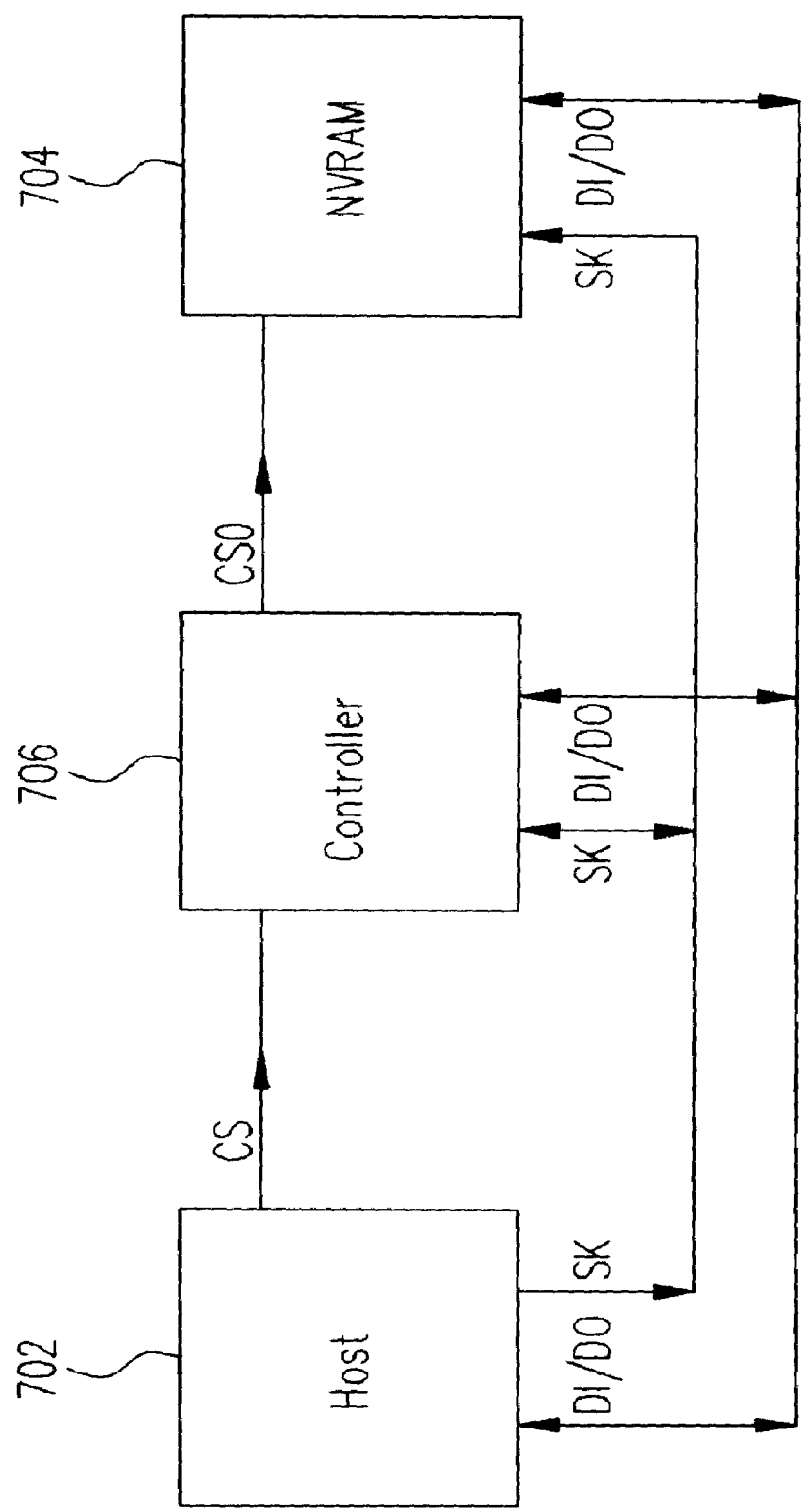
FIG. 7A is a block diagram showing a 3-wire mechanism for coupling the host, the controller, and the NVRAM in accordance with one preferred embodiment of the invention.

FIG. 7A is a block diagram showing one preferred embodiment in accordance with the present invention. The circuit layout of the architecture 700 is similar to that shown in FIG. 3, but a 3-wire mechanism is employed and the data-input, data-output are sharing the same wire in FIG. 7A. Signal timing chart of NVRAM 704 are similar to that in FIGS. 4, 5A and 5B. The host 702 controls the controller 706 and the NVRAM 704, respectively, according to potential level of a pragmatic bit.

Figure 7B:
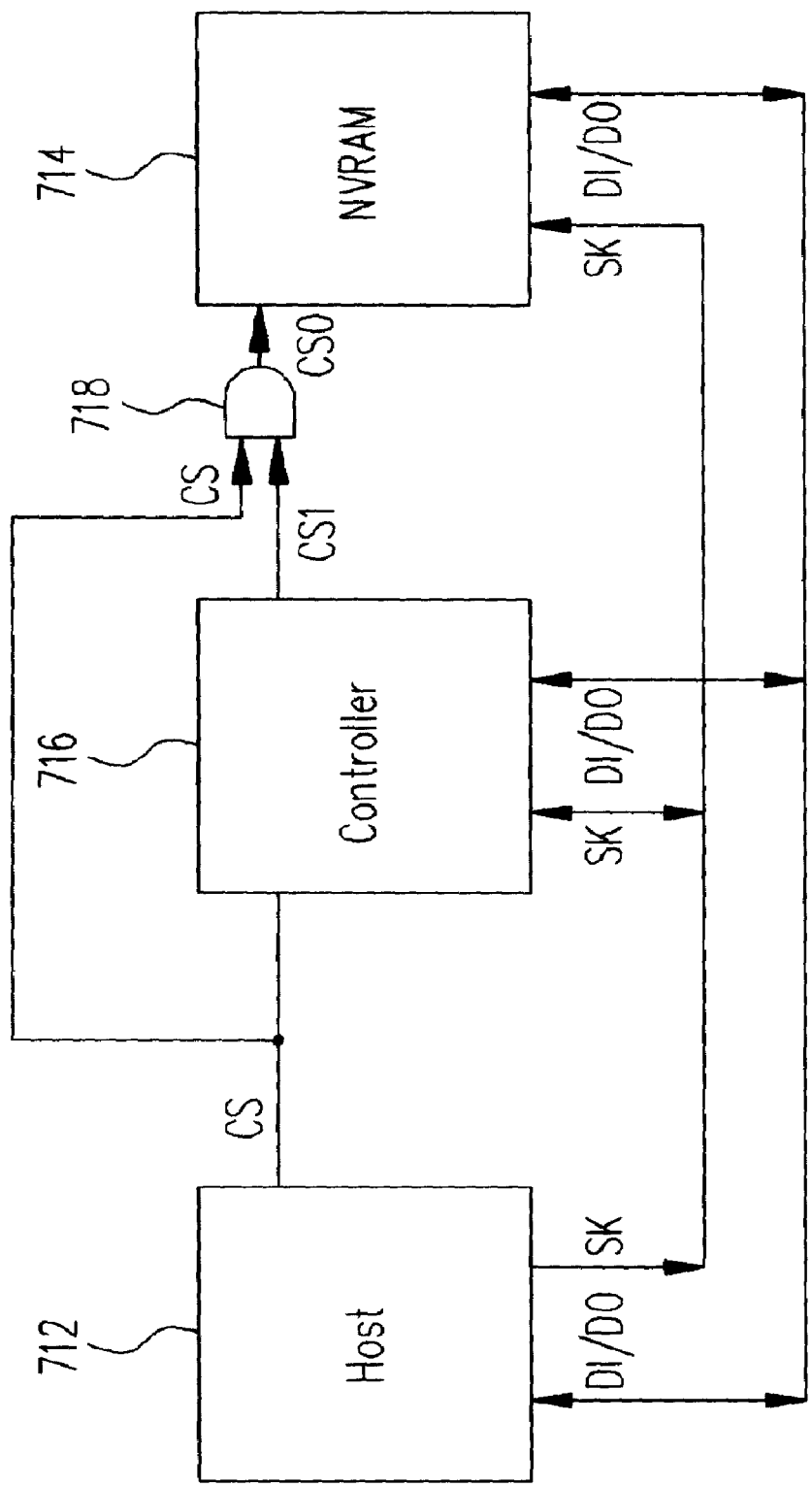
FIG. 7B is a block diagram showing a 3-wire mechanism for coupling the host, the controller, and the NVRAM in accordance with one preferred embodiment with use of AND gate.

FIG. 7B is a block diagram showing one preferred embodiment in accordance with the invention. The 3-wire architectures respectively shown in FIG. 7B and FIG. 7A are similar, but AND gate 718 is used to connect a chip-select lines CS and CS1 to enable the NVRAM 714 in FIG. 7B.

Figure 8A:
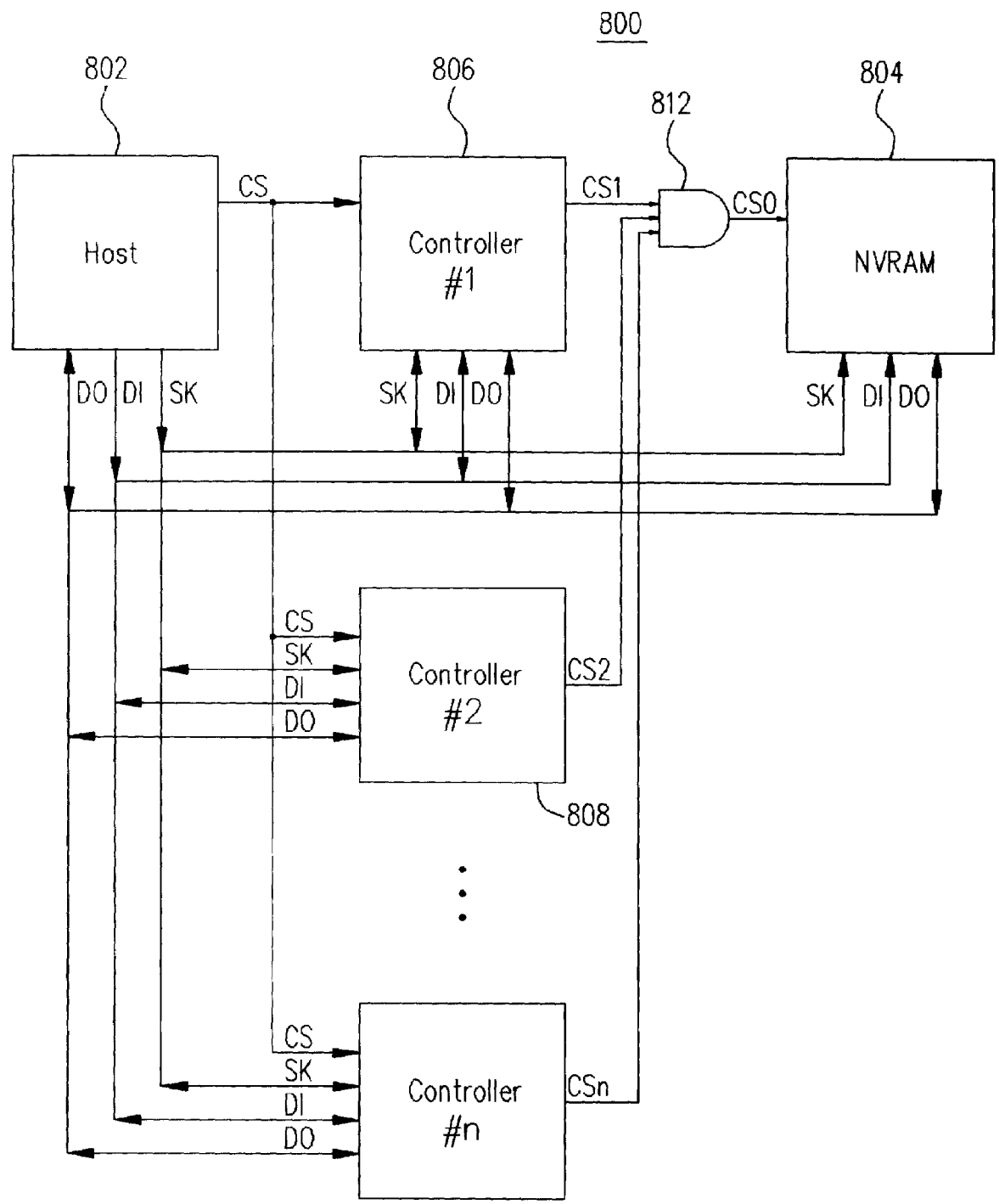
FIG. 8A is a block diagram showing a 4-wire mechanism in accordance with one preferred embodiment with a plurality of controllers.

FIG. 8A is a block diagram showing one preferred embodiment in accordance with the invention. The 4-wire architectures respectively shown in FIG. 8A and FIG. 3 are similar, but the preferred embodiment of FIG. 8A includes n sets of controllers (#1~#n) and the AND gate 812 in FIG. 8A. The AND gate 812 is coupled with each controller via chip-select lines (CS1~CSn), and the output terminal of the AND gate 812 is coupled with a NVRAM 804 via a chip-select line (CS0).

The following is an illustration of an access method in accordance with the preferred embodiment depicted in FIG. 8A. The performance is similar to that depicted in FIG. 3, but single host 802 is able to instruct a plurality of controllers (#1~#n) and the NVRAM 804 in FIG. 8A. Referring to FIG. 8A in combination with FIG. 5A, when the pragmatic bit 500 is at a high potential level, these controllers, as shown in FIG. 8A, will perform according to the instructions received, send out a signal of low potential level to the input terminal of the AND gate 812, and consequently cause that the AND gate provides a low potential level through its output terminal. Since the chip-select line (CS0) is at a low potential level, the NVRAM 814 is disabled. Moreover, the controllers will send out data via the data-output line (DO) when the pragmatic bit 500 is at a high potential level and the instructions received demand the controllers to send out data. The access method of FIG. 8A can be further illustrated with a reference to FIG. 5B. Please note that the controllers, as shown in FIG. 8A, send out data via the data-output line (DO) in according to the instructions issued by the host 802, and only one corresponding controller will respond to the instructions.

On the other hand, referring to FIG. 8A in combination with FIG. 4, when the pragmatic bit is at a low potential level, the controllers shown in FIG. 8A will ignore the instructions, maintain a signal of high potential level to the input terminal of the AND gate 812, and subsequently cause the AND gate 812 to output a high potential level. The NVRAM 814 is enabled and sends out data according to the instruction since the chip-select line carries a high potential level.

Figure 8B:
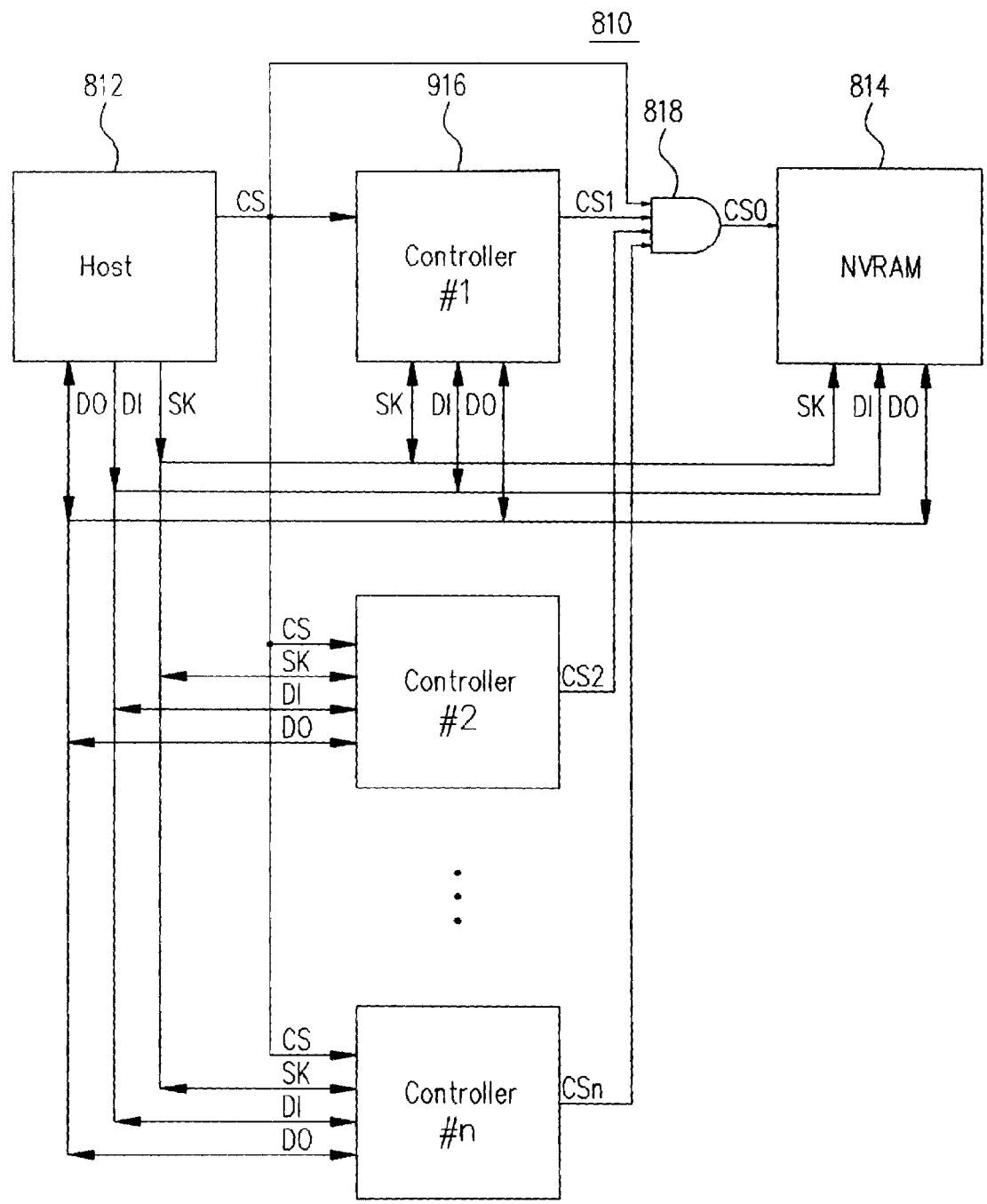
FIG. 8B is a block diagram similar to FIG. 8A, but with an additional wire connecting the CS from the host to the AND gate.

The preferred embodiments of 4-wire architectures respectively shown in FIG. 8B and FIG. 8A are similar, but an additional wire is used to connect the chip-select line (CS) and chip-select lines (CS1~CSn) for the host 812 to enable the NVRAM 814 in FIG. 8B.

Figure 9A:
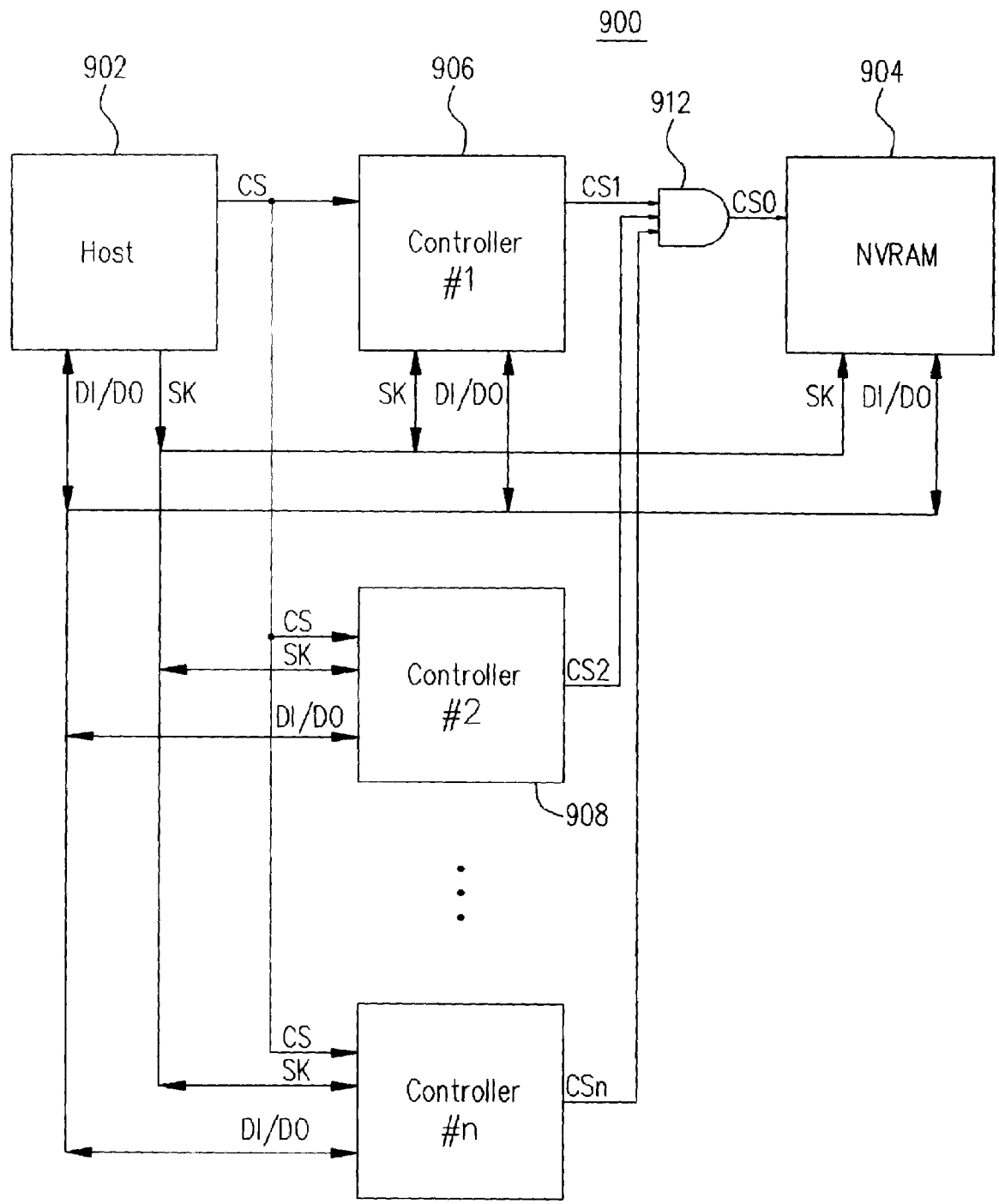
FIG. 9A is a block diagram showing a 3-wire mechanism in accordance with one preferred embodiment with a plurality of controllers.

FIG. 9A illustrates one preferred embodiment in accordance with the invention. FIG. 9A is similar to FIG. 8A, but a 3-wire architecture, rather than a 4-wire coupling scheme, is employed shown in FIG. 9A. Detailed description of the working principle of NVRAM 904 in FIG. 9A, which is similar to that in FIG. 8A, is omitted here for clarity and simplicity.

Figure 9B:
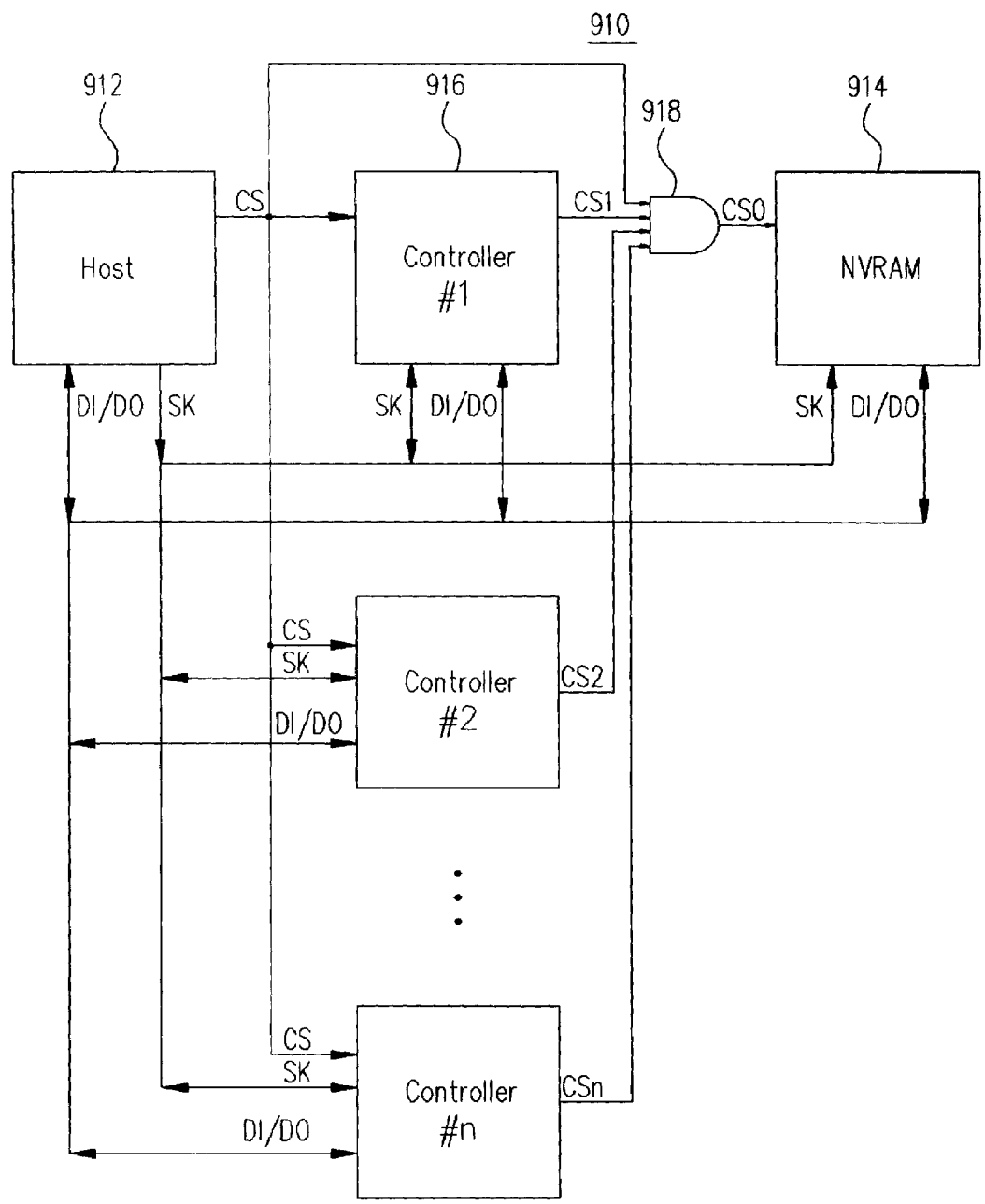
FIG. 9B is a block diagram similar to FIG. 9A, but with an additional wire connecting the host and the AND gate.

FIG. 9B depicts one preferred embodiment in accordance with the invention. The 3-wire architectures respectively shown in FIG. 9B and FIG. 9A are similar, but an additional wire is used to connect the chip-select line (CS) to the AND gate 918 for the host 912 to enable the NVRAM 914 in FIG. 9B. It should be noted that the pragmatic bit and the potential level have various modifications according to the varied embodiments in the present invention.

Figure 10:
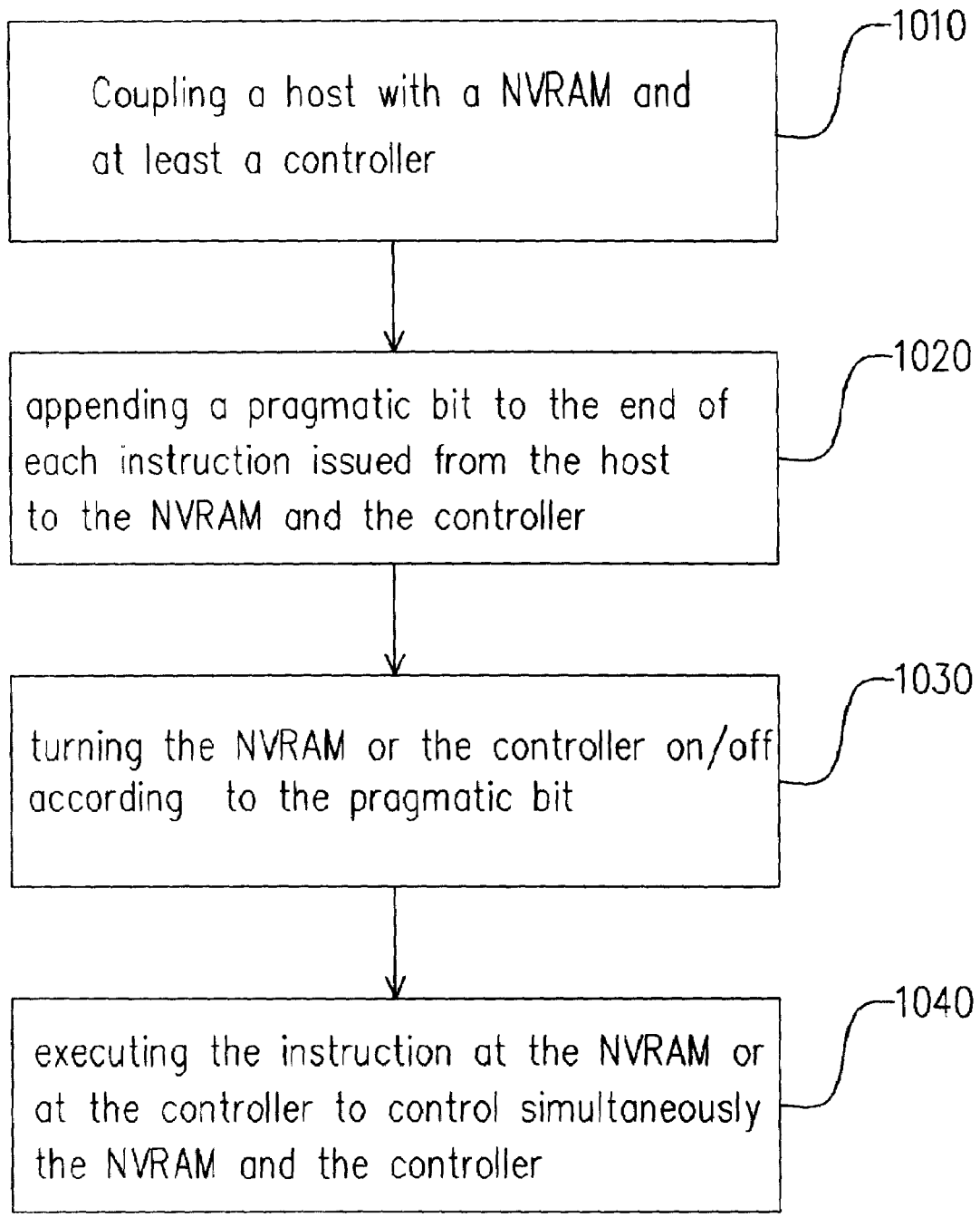
FIG. 10 is a flow chart depicting the method of multi-access NVRAM and controllers in accordance with the preferred embodiment of the present invention.

FIG. 10 depicts a method for multi-accessing a NVRAM, including the NVRAM, the host and at least one controller for the host. The method comprises first coupling the host with the NVRAM, and at least one controller (step 1010). Then, a pragmatic bit is appended to each instruction issued by the host to the NVRAM and the controller (step 1020). Based on the pragmatic bit, the NVRAM or the controller is turned on or off (step 1030). Therefore, the instruction can be executed at the NVRAM or at the controller to control simultaneously the NVRAM and the controller (step 1040).

In summary, the present invention provides an access method and architecture of NVRAM with a 3-wire/4-wire mechanism. According to the preferred embodiments of the invention, the utilization of the present invention for the design of multi-function chips of NVRAM can decrease the requisite number of pins of the chips. The method of the present invention is compatible with the conventional 3-wire/4-wire NVRAM. Programs to drive the host need only minor amendment or partial addition for normal performance.

It will be apparent to those skilled in the art that various modifications and variations can be made to the structure or to the methods of the preferred embodiment of the present invention without departing from the scope or spirit of the invention. In view of the foregoing, it is intended that the present invention covers modifications and variations of this invention provided they fall within the scope of the following claims and their equivalents.

The invention claimed is:

1. A method of coupling a host that is equipped with a central processing unit (CPU) level processing capacity, a non-volatile random access memory (NVRAM), and at least a controller together to allow the host to access the NVRAM and the controller, the method comprising:
    transmitting an instruction and a pragmatic bit from the host to the controller and the NVRAM, wherein the controller is coupled with the host and the NVRAM, respectively via a chip-select line, a system-clock line and a data transmission_wiring ;
    indicating the instruction either for the NVRAM or for the controller by the pragmatic bit which is accompanied with the instruction;
    turning either the NVRAM or the controller on/off according to the pragmatic bit; and
    executing the instruction either at the NVRAM or at the controller to control simultaneously the NVRAM and the controller.

2. The method of claim 1, wherein the data transmission wiring_comprises a data-input line to construct a 3-wire mechanism for transmitting the instruction and the pragmatic bit.

3. The method of claim 1, wherein the data transmission wiring_comprises a data-input line and a data-output line to construct a 4-wire mechanism for transmitting the instruction and the pragmatic bit.

4. The method of claim 1, wherein the pragmatic bit is a binary bit appended_to the end of the instruction that is issued from the host to the NVRAM and the controller.

5. The method of claim 4, wherein the binary bit respectively triggers the NVRAM and the controller to respond to the instruction when it is respectively at two different states.

6. The method of claim 1, wherein the instruction disables signal transmissions of the NVRAM responsive to the data transmission wiring and the system-clock line if the instruction is for the controller according to the pragmatic bit.

7. The method of claim 1, wherein the instruction enables signal transmissions of the NVRAM responsive to the data-input line and the system-clock line if the instruction is for the NVRAM according to the pragmatic bit, and the signal transmissions of the controller responsive to the data-input line and the system-clock line are disabled.

8. The method of claim 1, further comprising a step of appending setup information to the pragmatic bit to set the controller according to the setup information if the instruction is used to configure the controller before the step of transmitting the instruction and the pragmatic bit.

9. The method of claim 1, wherein the controller transmits data to the host after the controller receives the pragmatic bit if the host issues the instruction to read the data from the controller during the step of executing the instruction.

10. A multi-access architecture of a non-volatile memory, comprising:
    a host for transmitting an instruction and a pragmatic bit via a first chip-select line, a system-clock line and a data transmission wiring, wherein the pragmatic bit is accompanied with the instruction;
    a non-volatile random access memory (NVRAM) electrically connected to the host by the system-clock line and the_data transmission_wiring so that the host is able to access the NVRAM; and
    at least a controller electrically connected to the host and the NVRAM via the first chip-select line, a second chip-select line, the system-clock line and the_data transmission wiring, respectively for differentiating the instruction sent to the NVRAM from the instruction sent to the controller according to the pragmatic bit, wherein the instruction is executed either at the NVRAM or at the controller to control simultaneously the NVRAM and the controller so that the pragmatic bit turns on/off the NVRAM and the controller.

11. The multi-access architecture of claim 10, wherein the data transmission wiring comprises a data-input line to construct a 3-wire mechanism for transmitting the instruction and the pragmatic bit.

12. The multi-access architecture of claim 10, where-in the data transmission wiring comprises a data-input line and a data-output line to construct a 4-wire mechanism for transmitting the instruction and the pragmatic bit.

13. The multi-access architecture of claim 10, wherein the pragmatic bit is a binary bit appended to the end of the instruction that is issued by the host to the NVRAM and the controller.

14. The multi-access architecture of claim 13, wherein the binary bit respectively triggers the NVRAM and the controller to respond to the instruction when it is respectively at two different states.

15. The multi-access architecture of claim 10, wherein the instruction disables signal transmissions of the NVRAM responsive to the data transmission wiring and the system-clock line if the instruction is for the controller according to the pragmatic bit.

16. The multi-access architecture of claim 10, wherein the instruction enables signal transmissions of the NVRAM responsive to the data-input line and the system-clock line if the instruction is for the NVRAM according to the pragmatic bit, and the signal transmissions of the controller responsive to the data-input line and the system-clock line are disabled.

17. The multi-access architecture of claim 10, wherein the pragmatic bit comprises setup information to set the controller if the instruction is for the controller.

18. The multi-access architecture of claim 10, wherein the controller transmits data to the host if the host issues the instruction to read the data from the controller.

19. The multi-access architecture of claim 10, further comprising a AND gate having a plurality of input terminals of die first chip-select line and the second chip-select line and having an output terminal to be coupled with the NVRAM.

* * * * *